US006924326B2

(12) United States Patent
Meyer et al.

(10) Patent No.: US 6,924,326 B2
(45) Date of Patent: Aug. 2, 2005

(54) METHOD AND FORMULATION USING PASSIVE ELECTROSTATICITY FOR IMPROVING FILTER PERFORMANCE

(75) Inventors: John A. Meyer, Palm City, FL (US); Robert P. Scaringe, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 501 days.

(21) Appl. No.: 09/922,785

(22) Filed: Aug. 7, 2001

(65) Prior Publication Data

US 2003/0032694 A1 Feb. 13, 2003

(51) Int. Cl.⁷ ................................................. C08K 3/00
(52) U.S. Cl. ..................................... 523/122; 252/88.2
(58) Field of Search .......................... 523/122; 252/88.2

(56) References Cited

U.S. PATENT DOCUMENTS

| | | | |
|---|---|---|---|
| 4,702,752 A | 10/1987 | Yanagawa | |
| 4,944,778 A | 7/1990 | Yanagawa | |
| 5,288,298 A | 2/1994 | Aston | |
| 5,690,719 A | 11/1997 | Hodge | |
| 5,753,563 A | 5/1998 | Guan et al. | |
| 5,840,245 A | 11/1998 | Coombs et al. | |
| 6,113,815 A | * 9/2000 | Elfersy et al. ............... | 252/588 |

* cited by examiner

*Primary Examiner*—Edward J. Cain
(74) *Attorney, Agent, or Firm*—Crowell & Moring LLP

(57) ABSTRACT

A method treats ordinary filters with an electrostatic material that will turn any filter into a passive electrostatic filter. A formulation is sprayed or otherwise applied onto the filter to increase the filter's ability to effectively reduce indoor air particulates and improve indoor air quality. The formulation includes a water-soluble dielectric formulation and can also be combined with a biocide.

57 Claims, No Drawings

METHOD AND FORMULATION USING PASSIVE ELECTROSTATICITY FOR IMPROVING FILTER PERFORMANCE

BACKGROUND OF THE INVENTION

The presence of indoor air particulates is a concern, especially for those people afflicted with breathing or lung disorders such as asthma. These diseases are characterized by an excessive respiratory sensitivity to various stimuli of which a major trigger is particulate matter in household air. Sources of these particulates are varied but a major fraction consists of cigarette smoke, pollen, mold, human/animal dander, feather particles and dust.

As air is circulated through the house via heating, ventilating, and/or air conditioning (HVAC) systems, particulate matter will accumulate inside the system where, especially in cooling systems, they serve as medium for bacteria and fungal growth. The dispersion of microbes such as bacteria, virus, mold, and fungus can be the source of sickness to exposed occupants in the climate controlled area. For example, *Legionella pneumophilia* has been found to exist in such an environment and has been linked to Legionnaire's Disease. Other microbes can contribute to "sick home" or "sick building" syndrome. Many people are also allergic to the molds and fungus entrained in the dwelling's ventilation as the air passes over contaminated condensate drain water and wet evaporator cooling coils.

The process of reducing indoor air particulates is conventionally accomplished by a filter which permits gases to pass through a porous, typically fiberlike, material that essentially blocks the path and captures the particles before they enter a heating, ventilating, and air conditioning (HVAC) system. Because the pores between fibers are typically larger than the airborne particles the filter relies on the random chance that the particle will become caught on a fiber. If the thickness of the filter is increased or the pores made smaller through the use of a tighter fiber weave, then the resistance to the passage of gases increases thereby increasing the pressure loss, reducing the air flow and ultimately decreasing the system's efficiency.

It is well known that ordinary and widely used, fiber air filters only remove about 20% of particulates when installed. While a denser filter medium would improve filtration, the increased pressure drop across the filter restricts airflow, which in turn causes a decrease in HVAC efficiency and air circulation. These coarse, fiber filters are also ineffective at removing smaller, respirable particles such as smoke particles and pollen, which are a major source of discomfort for people with respiratory conditions such as asthma.

It is also well known to apply a tacky surface to filters to retain particles on the filter's surface. For example, an existing product known as 'KwikKut™' made by 'Precisionaire, Inc.', is sold on the market as a filter spray for room air conditioners, furnaces, and central air. This product is composed of mineral oil and paraffinic oil for the stated purpose of enhancing filtering in heating, ventilating, and air conditioning systems. Applied to these filters, the spray creates a tacky surface that catches and holds dust, pollen, spores and other airborne contaminants. It can be used on either permanent or disposable filters.

A product known as "Filter Charger" is product offered by Web Products, Inc of Kansas City, Kans. and also uses a scented hydrocarbon spray that remains tacky after being applied by spraying to a filter. This product is formulated by combining a propylene glycol with dielectric properties with morpheline with ionic properties and, thereby negate the dielectric properties of the propylene glycol component.

The use of an adhesive surface to remove particles in the production of semiconductor wafers is disclosed in U.S. Pat. No. 5,753,563.

An alternative method designed for the purpose of increasing particulate removal efficacy without decreasing pore size fiber density is electrostatic attraction. Active electrostatic filters impart a high voltage charge between plates and any charged particles passing through are electrostatically withdrawn from the passing gases and captured on the charged surface (plates). This type of electrostatic system is costly and impractical for residential and small commercial applications because of the maintenance, high voltage, and safety requirements.

To alleviate the need for an applied voltage but still obtain the advantages of electrostatic dust removal, passive electrostatic systems have been developed. A passive electrostatic system relies on dielectric (non-conducting) fibers that harbor electrostatic charges produced from air friction as the air is drawn through the filter. U.S. Pat. No. 5,336,299 discloses an approach in which air passes through dielectric fibers to generate friction that induces a static charge that builds up to a substantial enough quantity to draw out any passing charged particles, namely household dust. This passive electrostatic charge approach is also generally disclosed in U.S. Pat. Nos. 4,702,752; 5,690,719; and 4,944,778 where dielectric fibers are used to capture dust and enhance filter performance. The passive electrostatic filter behaves similarly to active electrostatic filters whereby dust is drawn from the air and adsorbed to the fibers by electrostatic forces without the need for exterior power. Typically because of the cost, this type of passive electrostatic filter is cleaned and reused rather than discarded when dirty.

Moreover, the idea of impregnating a filter with an antimicrobial substance is described in U.S. Pat. No. 5,288,298 where foam filter media is impregnated with an antimicrobial agent, and in U.S. Pat. No. 5,840,245 where inorganic antimicrobial agents are used.

SUMMARY OF THE INVENTION

An object of the present invention is to create a passive low-cost electrostatic filter from an ordinary low-cost non-electrostatic disposable filter. In this way, the low-cost filter could be disposed instead of cleaned. Further the present invention adds particulate retention capability and biocidal disinfection capability. We have achieved these and other objects by using a water-based liquid formulation which after application to an ordinary non-electrostatic filter (such as a metallic filter, disposable filter, or foam filter), will produce a dielectric filter surface and hence, turn an ordinary filter into a passive electrostatic filter. To further improve performance, this liquid formulation can be combined with other water-soluble, non-ionic dielectric compounds, to provide a tacky surface to improve retention of particulates and a biocide to provide a disinfecting action.

To address the problem of dust material accumulating on the filter and serving as a food source for xeroscopic bacteria or fungi, we have further identified biocides that can be incorporated and will not destroy the electrostatic action of the compound being applied to the filter. A biocide present in the filter is particularly advantageous to individuals coping with poor indoor air quality. Therefore our invention includes a filter treatment that when applied to an ordinary filter, increases the filter's efficiency without constraining airflow or increasing the filter's pressure drop, improves the retention of captured contaminates, and kills bacteria and fungi entrained on the fibers.

One currently preferred embodiment of the present invention improves air filtration by using the above-mentioned electrostatic, adhesive and biocidal properties with the application of a suitable liquid formulation to a filter. The first property, i.e. electrostatic forces, is possible because of the dielectric properties of certain liquids which include oils and aliphatic liquids such as alkanes; polyhydric alcohols such as glycols or glycerin and nonionic surfactants such as the alkylphenolhydroxypolyoxyethylene polymers. These non-ionic, metal free organic liquids are known in the art as dielectric substances and hence, have high resistance to electric current.

We have discovered that a water-soluble electrostatic compound can be applied onto an ordinary non-electrostatic filter medium and, after the compound dries, the treated surface exhibits electrostatic characteristics. After the application of the water-soluble dielectric liquid onto a non-electrostatic filter or the like, static charges will accumulate on the surface and provide a passive electrostatic environment to draw the dust out of the air and onto the surface.

The present invention utilizes a non-conducting (dielectric) material that when applied to an ordinary, non-electrostatic filter, creates the dielectric environment necessary to attract dust. Electrically insulating dielectric compounds suitable for this application are non-ionic, organic compounds rich in or at lest partly rich in saturated or aliphatic regions dominated by hydrogen and carbon. Other functional groups can also be present and include the hydroxyl, ketone and ether functional groups. It is imperative, however that the compound does not ionize since any ions present will serve to carry electrical current which would then dissipate static charges. It is also important that the compound be water-soluble so that it can be dissolved into deionized water for proper dilution and ease of application. A water-based formulation means the resulting formulation is non-flammable, non-combustible, environmentally benign, and dries easily on the filter surface it is applied to.

An example of a dielectric compound, which is also non-toxic and water-soluble is alkylphenolhydroxypolyoxyethylene noted by the chemical formula: $C_{14}H_{22}0(C_2H_40)_{100}$. This compound is completely non-ionizing and contains both an aliphatic region and a region rich in hydroxyl and ether functional groups. This compound is usually used as a surfactant, and sold under the trade name of TritonX100, however we measured the electrical resistance to be 3.33E+07 ohms/cm and therefore the compound has excellent dielectric (non-conductive, insulating) properties, making it ideal for this application.

The present invention has the added benefit of adding a non-ionic biocide into the compound applied to the filter surface. This biocide must, however, be non-ionic so that the electrostatic charges developed on the surface of the filter are not destroyed. This non-toxic biocide is not to be impregnated into the filter material, but applied to the surface as part of the mixture. Many compounds such as polychlorophenoxyphenols are well known in the art to control bacterial growth on surfaces.

DETAILED DESCRIPTION OF THE INVENTION

According to a presently preferred embodiment of the present invention, a non-flammable, non-combustible solution having active agents is employed. The active agents include a water-soluble dielectric, substance dissolved in a non-flammable, non-combustible, non-ionic, non-conductive dielectric solvent such as de-ionized water and can also include a biocide that is applied onto a HVAC air filter in a climate control or ventilation system, including central air conditioning and heating systems, packaged terminal air conditioning systems (PTACS), window air conditioners, room humidifiers and de-humidifiers, and the like. The solvent must be non-conductive after a dries on the filter. Therefore, it water is used as the solvent, it must be deionized. The filter can be any kind of filter such as a fibered filter, and open cell foam filter that is commonly sold as a washable filter, disposable filter, metal mesh filter and the like. Filtration systems could also include porous sponge filters used on smaller HVAC systems or freezers.

The application of the solution can be accomplished by (1) atomizing the material to form a spray, (2) brushing the material on the filter surface and/or (3) dipping the entire filter into the liquid. It is a preferred embodiment of this invention for the solution material to be applied by spray atomization due to ease and convenience.

A filter treatment formulation in accordance with the present invention can be formed by dissolving non-ionic surfactants and a biocidal agent into a solution of deionized water and applying the mixture to the filter surface where it then drys. This formulation is advantageous because the use of water as a solvent makes the mixture non-flammable and non-combustible so as to substantially increase safety. Biocidal agents include, but are not limited to, polychlorophenoxyphenols such as 3-(4-chlorophenyl)-1-(3,4-dichlorophenyl) urea or 2,4,4'-trichloro-2'-hydroxydiphenyl (Trade name: TRICLOSAN). Surfactants that can at least partially dissolve in water include polyhydric alcohols such as glycerin or polyhydric alcohol surfactants such as alkylphenol-hydroxy(xyethylene)$_{100}$.

It is also a currently preferred embodiment of this invention to use a combination of non-ionic surfactants dissolved in deionized water with one or more biocidal agents in the formulation.

EXAMPLES FOR FILTER SPRAY FORMULATION

No. 1. A mixture of 50% glycerin and 50% deionized water was combined and sprayed onto both sides of a quarter panel on a standard 16"×25" coarse fiber HVAC filter. This filter was placed in an air handling system for 1 month and rotated weekly to prevent bias due to non-uniform air flow. After 1 month, the filter was removed and pieces from each of the test squares were cut out, measured and soaked in isopropanol to extract the contaminates. Afterwards, a tared filter was used to filter the dust from the isopropanol and weighed afterwards once drying was complete. Results are interpreted as grams of dust captured/$cm^2$ of filter surface. For this particular sample, 0.000398 grams of dust per $cm^2$ was withheld compared to a control present on the same filter that entrained 0.000258 g dust per $cm^2$ This represents a 54% increase in dust retention.

No. 2 A mixture of 15% alkylphenol-hydroxy(xyethylene)$_{100}$ surfactant and 85% deionized water was combined and sprayed onto both sides of ⅙th panel on a 16"×25" standard coarse fiber HVAC filter. This filter was placed in an air handling system for 39 days and rotated weekly to prevent biased non-uniform air flow. On Day 40, the filter was removed and pieces from each of the test squares were cut out, measured and soaked in isopropanol to extract the dust. Afterwards, a tared filter was used to filter the dust from the isopropanol and weighed afterwards once drying was complete. Results are interpreted as grams of dust captured/cm$^2$ of filter surface. For this particular sample, 0.002239 grams of dust per cm$^2$ was withheld compared to a control present on the same filter that entrained 0.000504 g dust per cm2. This represents a 344% increase in dust retention.

No. 3 A mixture of 15% alkylphenol-hydroxy(xyethylene)$_{45}$ surfactant and 85% deionized water was combined and sprayed onto both sides of ⅛th panel on a 16"×25" standard coarse fiber HVAC filter. This filter was placed in an air handling system for 39 days and rotated weekly to prevent biased non-uniform air flow. On Day 40, the filter was removed and pieces from each of the test squares were cut out, measured and soaked in isopropanol to extract the dust. Afterwards, a tared filter was used to filter the dust from the isopropanol and weighed afterwards once drying was complete. Results are interpreted as grams of dust captured/cm$^2$ of filter surface. For this particular sample, 0.002176 grams of dust per cm2 was withheld compared to a control present on the same filter that entrained 0.000504 g dust per cm2. This represents a 332% increase in dust retention.

While the invention has been described in connection with currently preferred embodiments, procedures, and examples, it is to be understood that such detailed description was not intended to limit the invention on the described embodiments, procedures, and examples. Instead, it is the intent of the present invention to cover all alternatives, modifications, and equivalent which may be included within the spirit and scope of the invention as defined by the claims hereto.

What is claimed is:

1. A method for treating a filter for a gaseous medium, comprising:
   preparing a dielectric liquid formulation which is non-ionizing in aqueous solutions,
   applying the formulation onto the filter,
   whereby the filter is provided with passive electrostatic properties.

2. The method of claim 1, wherein the liquid formulation is nonflammable and non-combustible.

3. The method of claim 1, wherein the formulation further comprises at least a dielectric biocide material.

4. The method of claim 1, wherein the formulation comprises a non-ionic surfactant.

5. The method of claim 4, wherein the non-ionic surfactant comprises an alkylphenol-hydroxypolyoxyethylene polymer.

6. The method claim 5, wherein the alkylphenol-hydroxypolyoxyethylene polymer is alkylphenol-hydroxy(xyethylene)$_{35,45}$ or $_{100}$.

7. The method of claim 1, wherein the formulation comprises at least one compound selected from the group consisting of mono or polyhydric alcohols, mono or polyethers, and mono or polyketone compounds.

8. The method of claim 7, wherein the polyhydric alcohol is one of propylene glycol and glycerin.

9. The method of claim 1, wherein at least one non-ionic biocide material is added to the formulation.

10. The method of claim 1, wherein the formulation comprises a non-ionic surfactant dissolved in a non-flammable, non-combustible solvent.

11. The method of claim 10, wherein the formulation is non-flammable and non-combustible.

12. The method of claim 10, wherein the non-ionic surfactant is an alkylphenol-hydroxypolyoxyethylene polymer.

13. The method of claim 12, wherein the alkylphenol-hydroxypolyoxyethylene polymer is alkylphenol-hydroxy(xyethylene)$_{35,45}$ or $_{100}$.

14. The method of claim 1, wherein the formulation comprises mono- or polyhydric alcohols, mono- or polyethers, or mono or polyketone compounds dissolved in a non-flammable solvent that leaves no conducting residue on the filter.

15. The method of claim 14, wherein the formulation comprises glycerin or propylene glycol dissolved in a non-flammable solvent that leaves no conducting residue on the filter.

16. The method of claim 14, wherein the formulation comprises a non-ionic surfactant dissolved in the non-flammable solvent that leaves no conducting residue on the filter.

17. The method of claim 16, wherein the non-ionic surfactant is alkylphenol-hydroxypolyoxyethylene polymer.

18. The method of claim 11, wherein the alkylphenol-hydroxypolyoxyethylene polymer is alkylphenol-hydroxy(xyethylene)$_{35,45}$ or $_{100}$.

19. The method of claim 10, wherein the formulation comprises a compound selected from the group consisting of mono or polyhydric alcohols, mono or polyethers, or mono or polyketone compounds dissolved in the non-flammable solvent that leaves no conducting residue on the filter.

20. The method of claim 19, wherein the formulation comprises glycerin or propylene glycol dissolved in the non-flammable solvent that leaves no conducting residue on the filter.

21. The method of claim 3, wherein the formulation comprises a non-ionic surfactant.

22. The method of claim 21, wherein the non-ionic surfactant is alkylphenol-hydroxypolyoxyethylene polymer.

23. The method of claim 22, wherein the alkylphenol-hydroxypolyoxyethylene polymer is alkylphenol-hydroxy(xyethylene)$_{35,45}$ or $_{100}$.

24. The method of claim 2, wherein the formulation comprises a compound selected from the group consisting of mono or polyhydric alcohol, mono or poly ether, and mono or polyketone compounds.

25. The method of claim 24, wherein the polyhydric alcohol is propylene glycol or glycerin.

26. The method of claim 3, wherein the non-ionic biocide is a polychlorophenoxyphenol.

27. The method of claim 26, wherein the polychlorophenoxyphenol is one of 3-(4-chlorophenyl)-1-(3,4-dichlorophenyl)urea and 2,4,4'-trichloro-2'-hydroxydiphenyl.

28. A formulation, which is non-ionizing in aqueous solutions, for improving filter performance, comprising an organic, non-ionic, water-soluble component and an organic, non-ionic, water-soluble biocide component applicable onto a filter.

29. The formulation of claim 28, wherein the water-soluble dielectric component is glycerin dissolved in deionized water.

30. The formulation of claim 28, wherein the dielectric component is propylene glycol dissolved in deionized water.

31. The formulation of claim 28, wherein the components are selected so as to be non-flammable and non-combustible.

32. The formulation of claim 28, wherein the water-soluble dielectric component is a non-ionic surfactant.

33. The formulation of claim 32, wherein the non-ionic surfactant is an alkylphenol-hydroxypolyoxyethylene polymer.

34. The formulation of claim 33, wherein the alkylphenol-hydroxypolyoxyethylene polymer is alkylphenol-hydroxy(xyethylene)$_{35,45}$ or $_{100}$.

35. The formulation of claim 28, wherein the water-soluble dielectric component is selected from the group consisting of mono or polyhydric alcohols, mono or polyethers, and mono or polyketone compounds.

36. The formulation of claim 35, wherein the polyhydric alcohol is one of propylene glycol and glycerin.

37. A formulation, which is non-ionizing in aqueous solutions, for treating a filter, comprising a water-soluble, organic, non-ionic, dielectric compound wherein the compound is selected so that, upon applying the formulation to the filter, passive electrostatic properties are imparted to the filter.

38. The formulation of claim 37, wherein the compounds are selected so that the formulation is non-flammable and non-combustible.

39. The formulation of claim 37, wherein the organic dielectric compound is a non-ionic surfactant.

40. The formulation of claim 39, wherein the non-ionic surfactant is an alkylphenol-hydroxypolyoxyethylene polymer.

41. The formulation of claim 40, wherein the alkylphenol-hydroxypolyoxyethylene polymer is alkylphenol-hydroxy $(\text{xyethylene})_{35,45}$ or too.

42. The formulation of claim 37, wherein the organic dielectric compound is selected from the group consisting of mono or polyhydric alcohols, mono or polyethers, and mono or polyketone compounds.

43. The formulation of claim 42, wherein the polyhydric alcohol is one of propylene glycol and glycerin.

44. The formulation of claim 37, wherein the formulation contains at least one non-ionic biocide material.

45. The formulation of claim 37, wherein the organic dielectric compound is a non-ionic surfactant, and wherein the non-ionic surfactant is dissolved in deionized water or an organic, non-flammable, non-combustible solvent that leaves no conducting residue on the filter.

46. The formulation of claim 37, wherein the formulation is metal free.

47. The formulation of claim 37, wherein the formulation consists essentially of a water-soluble organic dielectric; deionized water; and optionally, one or more additional organic components.

48. The formulation of claim 37, wherein the formulation consists essentially of a water-soluble organic dielectric; an organic solvent; and optionally, one or more additional organic components.

49. The formulation of claim 37, wherein the formulation consists essentially of at least one water-soluble organic dielectric compound; deionized water; at least one water-soluble organic biocide; and optionally, one or more additional organic components.

50. The formulation of claim 49, wherein the formulation is metal free.

51. A method for treating an air filter, comprising:

applying a liquid formulation onto the air filter, the liquid formulation consisting essentially of a water-soluble organic dielectric which is non-ionizing in aqueous solutions; optionally deionized water or an organic solvent component; and optionally, one or more additional organic components.

52. The method of claim 51, wherein the formulation is metal free.

53. The method of claim 51, wherein the formulation consists essentially of a water-soluble organic dielectric compound; at least one of deionized water or organic solvent; and optionally, one or more additional organic components.

54. The method of claim 53, wherein the formulation contains deionized water.

55. The method of claim 51, wherein the formulation consists essentially of one water-soluble organic dielectric compound; deionized water one water-soluble organic biocide; and optionally, one or more additional organic components.

56. The method of claim 55, wherein the formulation is metal free.

57. A filter for a gaseous medium treated according to the method of claim 1, wherein the filter has passive electrostatic properties.

* * * * *